United States Patent
Tan

(10) Patent No.: US 11,956,716 B2
(45) Date of Patent: Apr. 9, 2024

(54) COMMUNICATION METHOD AND APPARATUS FOR WEARABLE DEVICE, AND STORAGE MEDIUM AND TERMINAL

(71) Applicant: RDA (CHONGQING) MICROELECTRONICS TECHNOLOGIES CO., LTD., Chongqing (CN)

(72) Inventor: Shu Tan, Shanghai (CN)

(73) Assignee: RDA (CHONGQING) MICROELECTRONICS TECHNOLOGIES CO., LTD., Chongqing (CN)

( * ) Notice: Subject to any disclaimer, the term of this patent is extended or adjusted under 35 U.S.C. 154(b) by 373 days.

(21) Appl. No.: 17/611,638

(22) PCT Filed: May 7, 2020

(86) PCT No.: PCT/CN2020/088940
§ 371 (c)(1),
(2) Date: Nov. 16, 2021

(87) PCT Pub. No.: WO2020/233410
PCT Pub. Date: Nov. 26, 2020

(65) Prior Publication Data
US 2022/0232467 A1 Jul. 21, 2022

(30) Foreign Application Priority Data
May 17, 2019 (CN) .......................... 201910412328.7

(51) Int. Cl.
*H04W 48/18* (2009.01)
*H04W 48/08* (2009.01)

(52) U.S. Cl.
CPC ........... *H04W 48/18* (2013.01); *H04W 48/08* (2013.01)

(58) Field of Classification Search
CPC ....... H04W 48/18; H04W 48/08; H04W 8/22; H04W 48/12; Y02D 30/70
(Continued)

(56) References Cited

U.S. PATENT DOCUMENTS 10,440,643 B2 * 10/2019 Feng .................... H04B 17/309
2012/0207130 A1 8/2012 Jang et al.
(Continued)

FOREIGN PATENT DOCUMENTS

CN 101557634 A 10/2009
CN 101860924 A 10/2010
(Continued)

OTHER PUBLICATIONS

European Patent Office; European Extended Search Report; EP Application No. 20808850.0; 7 pages; dated May 9, 2023.
(Continued)

*Primary Examiner* — Huy C Ho
(74) *Attorney, Agent, or Firm* — Faegre Drinker Biddle & Reath LLP

(57) ABSTRACT

A communication method and apparatus for a wearable device, a storage medium and a terminal are provided. The method includes: determining a network camping preference mode of the wearable device, wherein the network camping preference mode is determined based on a network camping priority, and the network camping priority indicates priorities of a plurality of terminal capability levels of the wearable device during a network camping procedure of the wearable device; determining a network version of a network to be camped on; determining a first terminal capability level based on the network version and the network camping priority, wherein the first terminal capability level has a highest priority among the plurality of terminal capability levels and is adapted to the network version; and
(Continued)

communicating with the network to be camped on based on the first terminal capability level.

20 Claims, 4 Drawing Sheets

(58) Field of Classification Search
USPC .......................................................... 370/328
See application file for complete search history.

(56) References Cited

U.S. PATENT DOCUMENTS

| | | |
|---|---|---|
| 2016/0227540 A1 | 8/2016 | Chen et al. |
| 2017/0318478 A1 | 11/2017 | Basu Mallick et al. |
| 2018/0220294 A1 | 8/2018 | Ukil et al. |
| 2018/0338303 A1 | 11/2018 | Jia et al. |

FOREIGN PATENT DOCUMENTS

| | | | |
|---|---|---|---|
| CN | 102711219 A | 10/2012 | |
| CN | 103460622 A | 12/2013 | |
| CN | 105764045 A | 7/2016 | |
| CN | 107113657 A | 8/2017 | |
| CN | 107210895 A | 9/2017 | |
| CN | 109428773 A | 3/2019 | |
| EP | 3579593 A1 * | 12/2019 | .............. H04W 8/24 |
| WO | WO-2014206436 A1 * | 12/2014 | .......... H04W 76/026 |
| WO | 2018/033197 A1 | 2/2018 | |
| WO | 2018/140387 A1 | 8/2018 | |

OTHER PUBLICATIONS

China National Intellectual Property Administration; International Search Report; International Application No. PCT/CN2020/088940; dated Aug. 5, 2020.

Intel; CR on requirement applicability for non-BL CE UE for R15; 3GPP TSG-RAN4 Meeting #90bis R4-1902904; Apr. 12, 2019.

* cited by examiner

COMMUNICATION METHOD AND APPARATUS FOR WEARABLE DEVICE, AND STORAGE MEDIUM AND TERMINAL

CROSS-REFERENCE TO RELATED APPLICATIONS

This application is a National Stage of International Application No. PCT/CN2020/088940, filed on May 7, 2020, which claims the priority to Chinese Application No. 201910412328.7, filed on May 17, 2019 both of which are incorporated herein by reference.

TECHNICAL FIELD

The present disclosure generally relates to communication technology field, and more particularly, to a communication method and apparatus for a wearable device, a storage medium and a terminal.

BACKGROUND

With prosperous development of the mobile communications industry, specific market demands for wearable products have steadily increased. Such products usually require compactness and portability, which indicates that all kinds of mandatory components in communication devices have an evolutionary demand for continuous miniaturization. Accordingly, in actual engineering applications, it becomes extremely challenging to retain two or more receiving antenna paths that are usually mandatory for traditional communication devices due to a limited equipment space. Even if the two receiving antenna paths are retained in a wearable device, a physical distance between the two receiving antennas is too short and thus antenna radiation performance thereof has few differences with antenna radiation performance of a single receiving antenna, thereby causing cost to be higher than benefit.

Among Release 12 and earlier versions of Long Term Evolution (LTE), merely category 0 (Cat.0) is available in the 3rd Generation Partnership Project (3GPP) technology with single antenna operation capability. However, uplink and downlink transmission rates of Cat.0 are low (an upper limit is 1 Mbps theoretically). Wearable devices not only require high-speed data throughput capabilities such as video calls and/or Internet surfing, but also need to maintain good mobility experience. Therefore, conventional technologies cannot fully meet specific market demands for wearable products. As a result, 3GPP introduced in R13 a Cat.1bis terminal capability level, which allows using merely one receiving antenna channel while maintaining a downlink/uplink (DL/UL) data rate of 10 Mbps/5 Mbps at the conventional Cat.1 terminal capability level. In particular, the Cat.1bis terminal capability level can also operate normally in R12 and earlier network deployments with strong network compatibility.

Objectively, in specific wearable markets, the introduction of Cat.1bis features does almost meet all visible pain points, such as ow cost, acceptable data capacity, small size and low power consumption. However, unfortunately, as a single receiving antenna has an average loss of 4 dB in downlink coverage capability, user experience (including indicators such as mobility and a call drop rate) of wearable devices is inevitably much worse than that of smart phones.

Key shortcoming of wearable mobile communication devices represented by Cat.1bis is low downlink coverage capability. In 3GPP, there have been successful cases to follow on enhancing coverage indicators. 3GPP has officially introduced Machine-Type Communication (MTC) technology since the LTE R12 version, and provides technologies with power consumption/cost performance similar to 2G terminals and higher spectrum utilization to meet needs of Internet of Things.

First, 3GPP MTC technology has undergone two generations of evolution including R12 MTC and R13 enhanced MTC (eMTC), and achieved, on R13 Cat.M1 terminal capability level, coverage enhancement capability of 15 dB which is higher than that in a conventional LTE Frequency Division Duplex (FDD) mode and is enough to make up for the coverage loss introduced by the single receiving antenna.

Further, in R14 further-enhanced MTC (feMTC), a new Cat.M2 terminal capability level was introduced. Although the original R13 Cat.M1 DL/UL 1 Mbps/1 Mbps was upgraded to R14 Cat.M2 DL/UL 4 Mbps/7 Mbps with highest throughput capacity in theoretical, but is still lower than that of Cat.1bis.

Further, R14 feMTC also introduced Non-BL specification supporting coverage enhancement, that is, coverage enhancement capability is added to the Cat.0 and above (including Cat.1bis) capability levels. But unfortunately, as R14 neglects to configure a downlink 64QAM modulation mode for Non-BL terminals, spectrum efficiency of Non-BL Cat.1bis of the R14 version is relatively low. It is disastrous for network spectrum resources that this type of User Equipment (UE) gets a sufficiently high data throughput. The problem of low spectrum efficiency was not solved until R15 even-further-enhanced MTC (efeMTC) introduced downlink 64QAM modulation.

SUMMARY

Embodiments of the present disclosure may improve communication compatibility of wearable devices.

In an embodiment of the present disclosure, a communication method for a wearable device is provided, including: determining a network camping preference mode of the wearable device, wherein the network camping preference mode is determined based on a network camping priority, and the network camping priority indicates priorities of a plurality of terminal capability levels of the wearable device during a network camping procedure of the wearable device; determining a network version of a network to be camped on; determining a first terminal capability level based on the network version and the network camping priority, wherein the first terminal capability level has a highest priority among the plurality of terminal capability levels and is adapted to the network version; and communicating with the network to be camped on based on the first terminal capability level.

In an embodiment of the present disclosure, a storage medium having computer instructions stored therein is provided, wherein when the computer instructions are executed, the above method is performed.

In an embodiment of the present disclosure, a terminal including a memory and a processor is provided, wherein the memory has computer instructions stored therein, and when the processor executes the computer instructions, the above method is performed.

DETAILED DESCRIPTION

Figure 1:
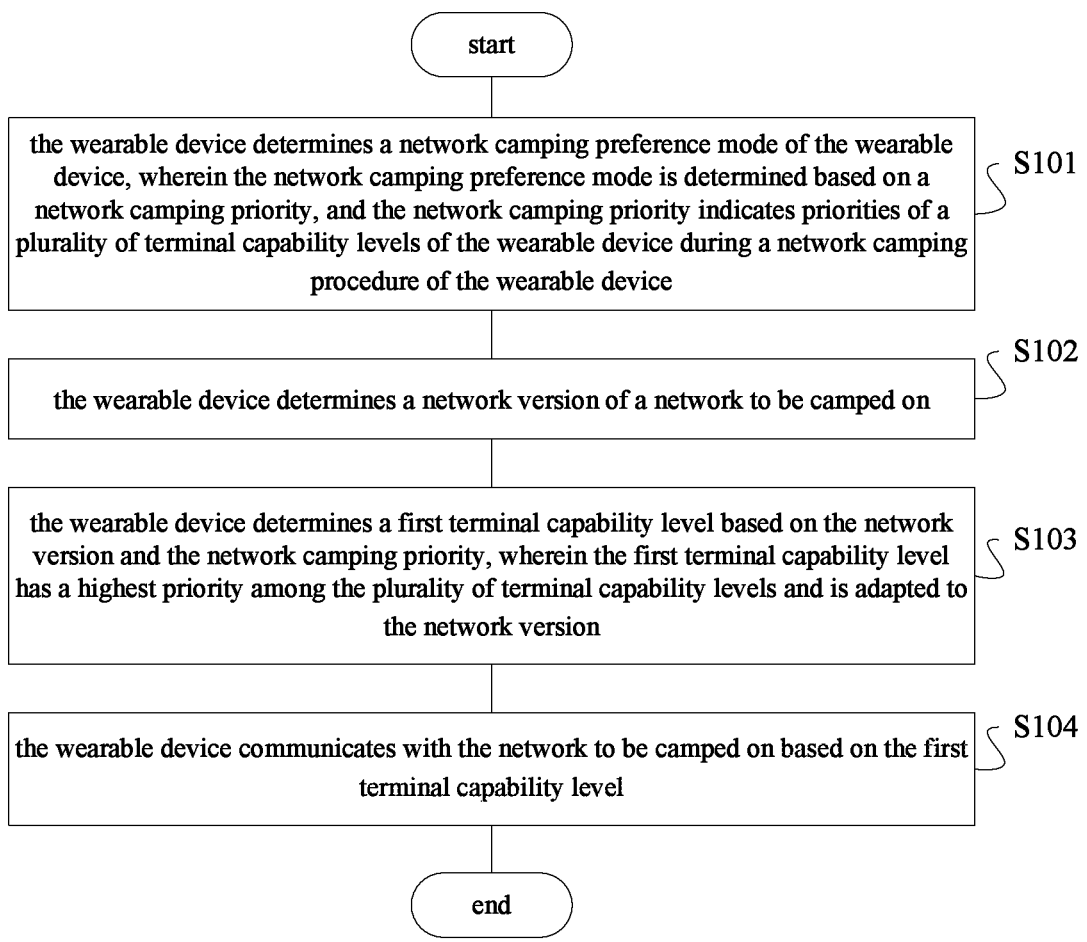
FIG. 1 is a flow chart of a communication method for a wearable device according to an embodiment.

As described in the background, existing wearable mobile devices cannot adapt to uneven global network deployment and cannot guarantee the best user experience.

TABLE 1

| terminal capability level | advantages | disadvantages | workable network version |
|---|---|---|---|
| Cat. 1bis | 1. highest uplink and downlink data throughout capability<br>2. workable in any LTE network version | 1. average downlink coverage loss of about 4 dB<br>2. worst performance in low power consumption | any LTE network version |
| Cat. M1 | 1. coverage enhancement capability of 15 dB at highest<br>2. best performance in low power consumption | lowest uplink and downlink data throughout capability | R13 |
| Cat. M2 | 1. coverage enhancement capability of 15dB at highest<br>2. relatively high uplink and downlink data throughout capability | R14 or higher network version is required | R14 |
| Non-BL Cat. 1bis | 1. coverage enhancement capability of 15 dB at highest<br>2. highest uplink and downlink data throughout capability | R15 or higher network version is required | R15 |

In Table 1, existing communication technologies applicable to wearable devices are summarized. Referring to Table 1, terminal capability levels established by different network versions have their own advantages and disadvantages. In global markets, deployment progresses of network versions in different regions are quite different, thereby resulting in poor communication compatibility of wearable devices and affecting user experience.

The inventor found through analysis that in existing solutions a specific terminal capability level is regularly used for network communication, and this causes different network versions to release different versions of wearable devices.

In embodiments of the present disclosure, a communication method for a wearable device is provided, including: determining a network camping preference mode of the wearable device, wherein the network camping preference mode is determined based on a network camping priority, and the network camping priority indicates priorities of a plurality of terminal capability levels of the wearable device during a network camping procedure of the wearable device; determining a network version of a network to be camped on; determining a first terminal capability level based on the network version and the network camping priority, wherein the first terminal capability level has a highest priority among the plurality of terminal capability levels and is adapted to the network version; and using the first terminal capability level to communicate with the network to be camped on.

From above, embodiments of the present disclosure provide a communication method for a wearable mobile device that takes into account data transmission, coverage enhancement and standby time, so that the wearable device can take into account data transmission capacity, coverage enhancement level and the standby time adaptively in network deployment of different versions, and accordingly communication compatibility of the wearable device is improved. Specifically, the appropriate network camping priority is determined based on the network camping preference mode, and the terminal capability level with the highest priority that is adapted to the network version of the network to be camped on is selected for communication. Therefore, the used terminal capability level is not only supported by the current network version, but also has great advantages in key indicators such as data transmission, coverage capability and standby time.

Further, compared with some solutions where a specific terminal capability level is regularly used to communicate with a network, in embodiments of the present disclosure, the most suitable terminal capability level among various terminal capability levels is selected adaptively to communicate with the network based on the network deployment version without additional hardware cost, so as to flexibly take into account key indicators such as data transmission, coverage capability and standby time. With the communication method provided in the embodiments of the present disclosure, the best user experience of wearable mobile communication may be provided to users in any global version of network.

In order to clarify the objects, characteristics and advantages of the disclosure, embodiments of present disclosure will be described in detail in conjunction with accompanying drawings.

FIG. 1 is a flow chart of a communication method for a wearable device according to an embodiment. The method may be applied at a UE side, for example, performed by the wearable device.

Referring to FIG. 1, in some embodiments, the method may include S101 to S104.

In S101, the wearable device determines a network camping preference mode of the wearable device, wherein the network camping preference mode is determined based on a network camping priority, and the network camping priority indicates priorities of a plurality of terminal capability levels of the wearable device during a network camping procedure of the wearable device.

In S102, the wearable device determines a network version of a network to be camped on.

In S103, the wearable device determines a first terminal capability level based on the network version and the network camping priority, wherein the first terminal capability level has a highest priority among the plurality of terminal capability levels and is adapted to the network version.

In S104, the wearable device communicates with the network to be camped on based on the first terminal capability level.

In some embodiments, the network camping preference mode may be predetermined when the wearable device is shipped from a factory. For example, for the wearable device sold to a specific region, a manufacturer may set an appropriate network camping preference mode based on a network version deployment situation of the specific region in factory settings, so that the wearable device can select a terminal capability level adapted to the network version of the specific region with better selection logic.

The better selection logic may refer to selecting the terminal capability level adapted to the network version of the specific region with less power consumption, where the less power consumption means less selection times and shorter selection time.

Further, in some embodiments, the network camping preference mode may be modified by users.

In some embodiments, the network camping preference mode includes a rate preference mode configured to determine the network camping priority based on uplink and downlink data throughput performance.

Further, in the rate preference mode, the terminal capability level with a highest priority is Non-BL Cat.1bis, and the terminal capability level with a second highest priority is Cat.1bis.

For example, referring to Table 1, for terminal capability levels adapted to wearable devices formulated as of R15, the terminal capability level Non-BL Cat.1bis which takes into account a highest rate and strongest coverage capability has the highest priority, and the terminal capability level Cat.1bis with the highest rate has the second highest priority. Therefore, a descending order of the network camping priority in the rate preference mode may be expressed as: Non-BL Cat.1bis>Cat.1bis>else.

In some embodiments, the network camping preference mode includes a power consumption preference mode configured to determine the network camping priority based on power consumption performance.

Further, in the power consumption preference mode, the terminal capability level with a highest priority is Cat-M1, and the terminal capability level with a second highest priority is Cat.1bis.

For example, referring to Table 1, for the terminal capability levels adapted to wearable devices formulated as of R15, the terminal capability level Cat.M1 with lowest power consumption has the highest priority. Based on the wearable device failing to camp on a network to be camped on using the terminal capability level Cat.M1, it indicates that the network version of the network to be camped on is before R13, and then the terminal capability level Cat.1bis is used for network camping and other communication operations. Therefore, the descending order of the network camping priority in the power consumption preference mode may be expressed as: Cat-M1>Cat.1bis>else.

In some embodiments, the network camping preference mode includes a rate and coverage compromise mode configured to determine the network camping priority based on the uplink and downlink data throughput performance and coverage enhancement performance.

Further, in the rate and coverage compromise mode, the terminal capability level with a highest priority is Non-BL Cat.1bis, the terminal capability level with a second highest priority is Cat.M2, and the terminal capability level with a third highest priority is Cat.1bis.

For example, referring to Table 1, for the terminal capability levels adapted for wearable devices formulated as of R15, the terminal capability level Non-BL Cat.1bis which takes into account a highest rate and strongest coverage capability has the highest priority, followed by the rate, the terminal capability level Cat.M2 with a second highest rate and strongest coverage capability has the second highest priority, and the terminal capability level Cat.1bis with a relatively high rate and relatively strong coverage capability has the third highest priority. Therefore, a descending order of the network camping priority in the rate and coverage compromise mode may be expressed as: Non-BL Cat.1bis>Cat.M2>Cat.1bis>else.

It should be noted that the terminal capability levels adapted for wearable devices formulated in R15 and previous versions are taken as an example for description in the above embodiments. In practice, as the network version continues to be updated, those skilled in the art could flexibly adjust a priority order of the terminal capability levels in each mode based on above determination logic for priority.

In some embodiments, S102 may include: receiving system information of the network to be camped on; and determining the network version of the network to be camped on based on the system information.

In some embodiments, the system information may include an MIB and an SIB. The SIB may include SIB Type 1 (SIB1), SIB Type 2 (SIB2), SIB Type 3 (SIB3), SIB Type 5 (SIB5), SIB Type 14 (SIB14) and SIB Type 20 (SIB20).

For example, based on fields of a schedulingInfoSIB1-BR-r13 domain in the MIB being not all zeros, it may be determined that the network to be camped on supports coverage enhancement, that is, the network version of the network to be camped on is R13 or a later version. Conversely, based on fields of the schedulingInfoSIB1-BR-r13 domain in the MIB being all zeros, it may be determined that the network to be camped on does not support coverage enhancement, that is, the network version of the network to be camped on is R12 or an earlier version.

For another example, based on the systemInfoUnchanged-BR-r15 domain in the MIB being 1, it may be determined that the network to be camped on supports the R15 network version.

For another example, based on the SIB1, SIB2, SIB3, SIB5 and/or SIB14 containing an R15 information block expansion field, it may be determined that the network to be camped on supports the R15 network version.

For another example, based on the SIB5 or SIB20 containing an R14 information block expansion field, it may be determined that the network to be camped on supports the R14 network version.

In some embodiments, referring to Table 1, a main difference between the terminal capability level Cat.1bis and other listed terminal capability levels lies in that the terminal capability level Cat.1bis can be applied to a network version that does not support coverage enhancement.

Accordingly, S103 may include: based on the network version not supporting coverage enhancement, determining a terminal capability level with the highest priority and compatible with the network version that does not support coverage enhancement as the first terminal capability level.

In some embodiments, the terminal capability level with the highest priority and compatible with the network version that does not support coverage enhancement may be Cat.1bis.

In some embodiments, S102 may include: receiving an MIB of the network to be camped on; and determining whether the network version of the network to be camped on supports coverage enhancement based on the MIB.

For example, whether the network version of the network to be camped on supports coverage enhancement is determined based on whether fields of the schedulingInfoSIB1-BR-r13 domain in the MIB are all zeros.

In some embodiments, referring to Table 1, for the R13 network version and updated network versions, the network versions have a one-to-one correspondence with the terminal capability levels formulated contemporaneity.

Accordingly, S103 may include: based on the network version supporting coverage enhancement, determining whether the plurality of terminal capability levels are adapted to the network version in accordance with priority from high to low to obtain a determination result; and determining the first terminal capability level based on the determination result.

For example, based on determining that the network to be camped on supporting the R15 network version, Non-BL Cat.1bis is determined as the first terminal capability level.

For another example, based on determining that the network to be camped on supporting the R14 network version Cat.M2 is determined as the first terminal capability level.

For another example, based on determining that the network to be camped on supporting the R13 network version, Cat.M1 is determined as the first terminal capability level.

Figure 2:
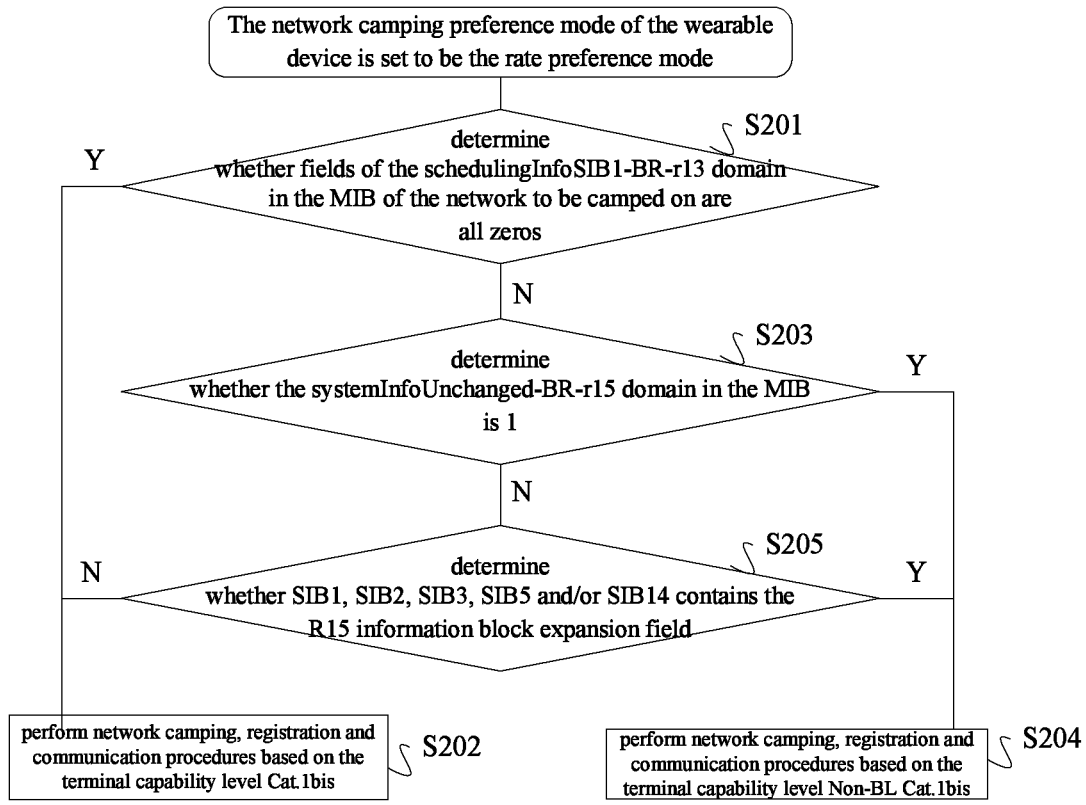
FIG. 2 is a flow chart of an application scenario according to an embodiment.

In an application scenario, assuming that the network camping preference mode of the wearable device is set to be the rate preference mode, referring to FIG. 2, the wearable device may determine the first terminal capability level by performing following steps, and further communicate with the network to be camped on based on the first terminal capability level.

Specifically, in the rate preference mode, a descending order of the network camping priority of each terminal capability level is Non-BL Cat.1bis>Cat.1bis>else.

In the scenario, referring to FIG. 2, the wearable device may read the MIB of the network to be camped on, and perform S201 to determine whether fields of the schedulingInfoSIB1-BR-r13 domain in the MIB are all zeros.

Based on relevant provisions of the 3GPP standard 36.213 and 36.331, the fields of the schedulingInfoSIB1-BR-r13 domain being non-all zeros means that the network to be camped on supports coverage enhancement.

Based on a determination result of S201 being affirmative, that is, the fields of the schedulingInfoSIB1-BR-r13 domain being all zeros, it is determined that the network to be camped on does not support coverage enhancement. That is, the network version of the network to be camped on is R12 or an earlier version, and the wearable device may perform S202 to perform network camping, registration and communication procedures based on the terminal capability level Cat.1bis. Based on a determination result of S202 being negative, that is, the fields of the schedulingInfoSIB1-BR-r13 being not all zeros, it is determined that the network supports coverage enhancement, that is, the network version of the network to be camped on is R13 or a later version, and the wearable device may perform S203 to further determine the network version of the network to be camped on.

Specifically, in S203, the wearable device may further determine whether the systemInfoUnchanged-BR-r15 domain in the MIB is 1 (TRUE).

Based on relevant provisions of the 3GPP protocols 36.213 and 36.331, the systemInfoUnchanged-BR-r15 domain being 1 indicates that a former base station to be camped on supports the R15 network version.

Based on relevant provisions of the 3GPP protocol 36.331, the systemInfoUnchanged-BR-r15 domain indicates whether there is a system information field update within 24 hours at the longest, which causes low timeliness. Therefore, based on the fields of the systemInfoUnchanged-BR-r15 domain being 0 (FALSE) at this time, it is necessary to further determine whether the network version of the network to be camped on supports R15 in conjunction with the SIB.

Based on a determination result of S203 being affirmative, that is, a value of the systemInfoUnchanged-BR-r15 domain being 1, it is determined that the network version of the network to be camped on is R15, and the wearable device may perform S204 to perform network camping, registration and communication procedures based on the terminal capability level Non-BL Cat.1bis; otherwise, based on the determination result of S203 being negative, that is, the fields of the systemInfoUnchanged-BR-r15 domain being zeros, the wearable device may further perform S205 to further determine the network version of the network to be camped on based on the SIB.

Specifically, in S205, the wearable device may perform a network camping procedure based on the terminal capability level Non-BL Cat.1bis with the highest priority in the network camping preference mode by default, so as to read an R15 information block expansion field that may be contained in the SIB, and determines the network version information in real time to guide the procedure.

For example, in S205, the wearable device may read SIB1 and determine whether it contains the R15 information block expansion field. The R15 information block expansion field in the SIB1 may correspond to a Cell Reference Signal muting (CRS muting) feature of the current serving cell.

For another example, in S205, the wearable device may read SIB2 and determine whether it contains the R15 information block expansion field. The R15 information block expansion field in the SIB2 may correspond to Early Data Transmission (EDT) feature.

For another example, in S205, the wearable device may read SIB3 and determine whether it contains the R15 information block expansion field. The R15 information block expansion field in the SIB3 may correspond to the CRS muting characteristics of an intra-frequency neighboring cell.

For another example, in S205, the wearable device may read SIB5 and determine whether it contains the R15 information block expansion field. The R15 information block expansion field in the SIB5 may correspond to a definition of an inter-frequency neighboring cell expansion list.

For another example, in S205, the wearable device may read the SIB14 and determine whether it contains the R15 information block expansion field. The R15 information block expansion field in the SIB14 may correspond to expansion access control characteristics based on a coverage enhancement level.

The above determination operations on SIB1, SIB2, SIB3, SIB5 and SIB14 may be performed synchronously or asynchronously. Based on a result of any one of the determination operations being affirmative, that is, any of the SIBs containing the R15 information block expansion field, the determination result of S205 is determined to be affirmative; otherwise, based on none of the SIB1, SIB2, SIB3, SIB5, and SIB14 containing the R15 information block expansion field, the determination result of S205 is determined to be negative.

Specifically, in S202, the wearable device may perform a communication operation with the network to be camped on based on relevant regulations in a 3GPP protocol 36.300.

Specifically, in S204, the wearable device may perform a communication operation with the network to be camped on based on relevant regulations in a 3GPP protocol 36.300.

Figure 3:
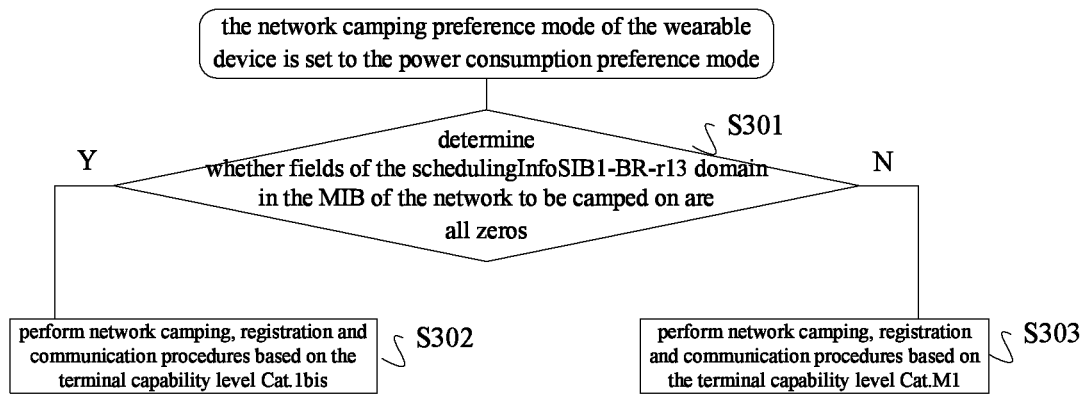
FIG. 3 is a flow chart of an application scenario according to an embodiment.

In another application scenario, assuming that the network camping preference mode of the wearable device is the power consumption preference mode, referring to FIG. 3, the wearable device may determine the first terminal capability level by performing following steps, and then communicate with the network to be camped on based on the first terminal capability level.

Specifically, in the power consumption preference mode, a descending order of the network camping priority of each terminal capability level is Cat-M1>Cat.1bis>else.

In the scenario, referring to FIG. 3, the wearable device may read the MIB of the network to be camped on, and perform S301 to determine whether fields of the schedulingInfoSIB1-BR-r13 domain in the MIB are all zeros.

Based on the determination result of S301 being affirmative, that is, fields of the schedulingInfoSIB1-BR-r13 domain being all zeros, it is determined that does not support coverage enhancement, that is, the network version of the network to be camped on is R12 or an earlier version. The wearable device may perform S302 to perform network camping, registration and communication procedures based on the terminal capability level Cat.1bis. Otherwise, based on the determination result of S301 being negative, that is, the fields of the schedulingInfoSIB1-BR-r13 domain being not all zeros, it is determined that the network to be camped on supports coverage enhancement, that is, the network version of the network to be camped on is R13 or a later version. The wearable device may perform S303 to perform network camping, registration and communication procedures based on the terminal capability level Cat.M1.

Figure 4:
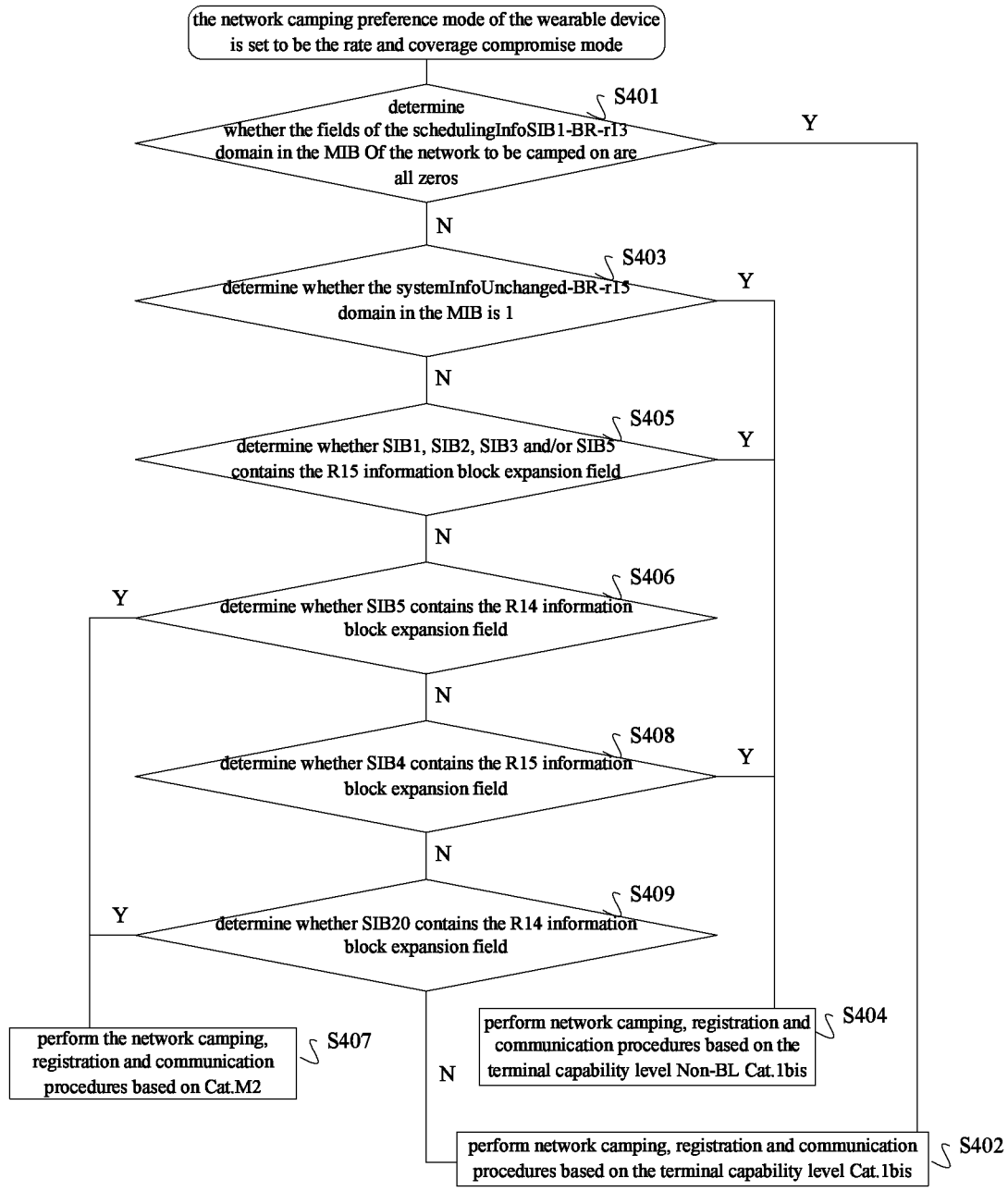
FIG. 4 is a flow chart of an application scenario according to an embodiment.

In another application scenario, assuming that the network camping preference mode of the wearable device is the rate and coverage compromise mode, referring to FIG. 4, the wearable device may determine the first terminal capability level by performing following steps, and then communicate with the network to be camped on based on the first terminal capability level.

Specifically, in the rate and coverage compromise mode, a descending order of the network camping priority of each terminal capability level is Non-BL Cat.1bis>Cat.M2>Cat.1bis>else.

In the scenario, referring to FIG. 4, the wearable device may read the MIB of the network to be camped on, and perform S401 to determine whether the fields of the schedulingInfoSIB1-BR-r13 domain in the MIB are all zeros.

Based on the determination result of S401 being affirmative, that is, the fields of the schedulingInfoSIB1-BR-r13 domain being all zeros, it is determined that the network to be camped on does not support coverage enhancement, that is, the network version is R12 or an earlier version. The wearable device may perform S402 to perform network camping, registration and communication procedures based on the terminal capability level Cat.1bis. Otherwise, based on the determination result of S401 being negative, that is, the fields of the schedulingInfoSIB1-BR-r13 domain being not all zeros, it is determined that the network to be camped on supports coverage enhancement, that is, the network version of the network to be camped on is R13 or a later version. The wearable device may perform S403 to further determine the network version of the network to be camped on.

Specifically, in S403, the wearable device may further determine whether the systemInfoUnchanged-BR-r15 domain in the MIB is 1 (TRUE).

Based on the determination result of S403 being affirmative, that is, a value of the systemInfoUnchanged-BR-r15 domain being 1, it is determined that the network version of the network to be camped on is R15, and the wearable device may perform S404 to perform network camping, registration and communication procedures based on the terminal capability level Non-BL Cat.1bis. Otherwise, based on the determination result of S403 being negative, that is, the value of the systemInfoUnchanged-BR-r15 domain is 0, the wearable device may further perform S405 to further determine the network version of the network to be camped on based on the SIB.

Specifically, in S405, the wearable device may implement the network camping procedure based on the highest priority terminal capability level Non-BL Cat.1bis in the network camping preference mode by default, so as to read the R15 information block expansion field that may be contained in the SIB, and determine the network version information in real time to guide the procedure.

For example, in S405, the wearable device may read SIB1, SIB2, SIB3 and/or SIB5, and determine whether any of the SIBs contains the R15 information block expansion field.

Based on a determination result of any one of the determination operations being affirmative, that is, based on any SIB of SIB1, SIB2, SIB3 and SIB5 containing the R15 information block expansion field, it is determined that the determination result of S405 is affirmative, and the wearable device may perform S404. Otherwise, based on none of the SIB1, SIB2, SIB3 and SIB5 containing the R15 information block expansion field, it is determined that the determination result of S405 is negative, and the wearable device may perform S406 to further determine the network version of the network to be camped on.

Specifically, in S406, the wearable device may read the SIB5 and determine whether it contains the R14 information block expansion field which may correspond to single-point-to-multipoint transmission characteristics.

Based on the determination result of S406 being affirmative, that is, the SIB5 containing the R14 information block expansion field, it is determined that the network to be camped on is the R14 network version, and the wearable device performs S407 to perform network camping, registration and communication procedures based on Cat.M2. Otherwise, based on the determination result of S406 being negative, that is, the SIB5 containing neither the R15 information block expansion field nor the R14 information block expansion field, the wearable device may perform S408 to further determine the network version of the network to be camped on.

Specifically, in S408, the wearable device may read the SIB14 and determine whether it contains the R15 information block expansion field.

Based on the determination result of S408 being affirmative, that is, the SIB14 containing the R15 information block expansion field, it is determined that the network to be camped on is the R15 network version, and the wearable device may perform S404 to perform the network camping, registration and communication procedures based on Non-BL Cat.1bis. Otherwise, based on the determination result of S408 being negative, that is, the SIB14 not containing the R15 information block expansion field, the wearable device may perform S409 to further determine the network version of the network to be camped on.

Specifically, in S409, the wearable device may read the SIB20, and determine whether it contains the R14 information block expansion field which may correspond to the single-point-to-multipoint transmission characteristics.

Based on the determination result of being affirmative, that is, the SIB20 containing the R14 information block expansion field, it is determined that the network to be camped on is the R14 network version, and the wearable device may perform S407 to perform the network camping, registration and communication procedures based on Cat.M2. Otherwise, based on the determination result of S409 being negative, that is, the R14 information block expansion field being not contained in the SIB20, it is determined that the network version of the network to be camped on is at least earlier than R14, and the wearable device may perform S402 to perform the network camping, registration and communication procedures based on Cat.1bis.

From above, embodiments of the present disclosure provide a communication method for a wearable mobile device that takes into account data transmission, coverage enhancement and standby time, so that the wearable device can take into account data transmission capacity, coverage enhancement level and the standby time adaptively in network deployment of different versions, and accordingly communication compatibility of the wearable device is improved. Specifically, the appropriate network camping priority is determined based on the network camping preference mode, and the terminal capability level with the highest priority that is adapted to the network version of the network to be camped on is selected for communication. Therefore, the used terminal capability level is not only supported by the current network version, but also has great advantages in key indicators such as data transmission, coverage capability and standby time.

Further, compared with some solutions where a specific terminal capability level is regularly used to communicate with a network, in embodiments of the present disclosure, the most suitable terminal capability level among various terminal capability levels is selected adaptively to communicate with the network based on the network deployment version without additional hardware cost, so as to flexibly take into account key indicators such as data transmission, coverage capability and standby time. With the communication method provided in the embodiments of the present disclosure, the best user experience of wearable mobile communication may be provided to users in any global version of network.

Figure 5:
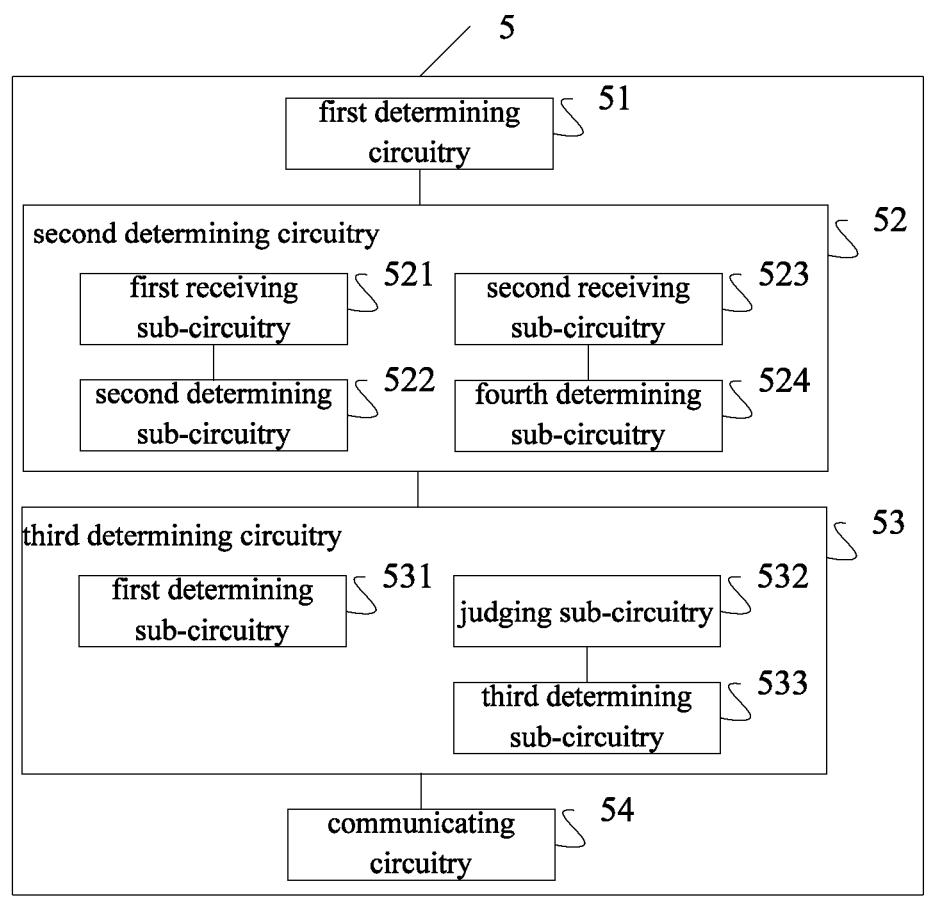
FIG. 5 is a structural diagram of a communication apparatus for a wearable device according to an embodiment.

Referring to FIG. 5, FIG. 5 is a structural diagram of a communication apparatus 5 for a wearable device according to an embodiment. Those skilled in the art could understand that the communication apparatus 5 may be configured to perform the method as shown in FIGS. 1 to 4.

The communication apparatus 5 includes: a first determining circuitry 51 configured to determine a network camping preference mode of the wearable device, wherein the network camping preference mode is determined based on a network camping priority, and the network camping priority indicates priorities of a plurality of terminal capability levels of the wearable device during a network camping procedure of the wearable device; a second determining circuitry 52 configured to determine a network version of a network to be camped on; a third determining circuitry 53 configured to determine a first terminal capability level based on the network version and the network camping priority, wherein the first terminal capability level has a highest priority among the plurality of terminal capability levels and is adapted to the network version; and a communicating circuitry 54 configured to communicate with the network to be camped on based on the first terminal capability level.

In some embodiments, the third determining circuitry 53 includes a first determining sub-circuitry 531 configured to: based on the network version not supporting coverage enhancement, determine a terminal capability level having a highest priority among the plurality of terminal capability levels and compatible with the network version that does not support coverage enhancement as the first terminal capability level.

In some embodiments, the first terminal capability level having the highest priority among the plurality of terminal capability levels and compatible with the network version that does not support coverage enhancement is Cat.1bis.

In some embodiments, the second determining circuitry 52 includes: a first receiving sub-circuitry 521 configured to receive an MIB of the network to be camped on; and a second determining sub-circuitry 522 configured to determine whether the network version of the network to be camped on supports coverage enhancement based on the MIB.

In some embodiments, the third determining circuitry 53 further includes a judging sub-circuitry 532 configured to: based on the network version supporting coverage enhancement, determine whether the plurality of terminal capability levels are adapted to the network version in accordance with priority from high to low to obtain a determination result; and a third determining sub-circuitry 533 configured to determine the first terminal capability level based on the determination result.

In some embodiments, the plurality of terminal capability levels correspond to network versions in a one-to-one correspondence.

In some embodiments, the second determining circuitry 52 includes a second receiving sub-circuitry 523 configured to receive system information of the network to be camped on; and a fourth determining sub-circuitry 524 configured to determine the network version of the network to be camped on based on the system information.

In some embodiments, the system information includes MIB, SIB1, SIB2, SIB3, SIB5, SIB14 or SIB20.

In some embodiments, the network camping preference mode includes a rate preference mode, a power consumption preference mode or a rate and coverage compromise mode, wherein the rate preference mode is configured to determine the network camping priority based on uplink and downlink data throughput performance, the power consumption preference mode is configured to determine the network camping priority based on power consumption performance, and the rate and coverage compromise mode is configured to determine the network camping priority based on the uplink and downlink data throughput performance and coverage enhancement performance.

In some embodiments, in the rate preference mode, the terminal capability level with a highest priority is Non-BL Cat.1bis, and the terminal capability level with a second highest priority is Cat.1bis; in the power consumption preference mode, the terminal capability level with a highest priority is Cat-M1, and the terminal capability level with a second highest priority is Cat.1bis; and in the rate and coverage compromise mode, the terminal capability level with a highest priority is Non-BL Cat.1bis, the terminal capability level with a second highest priority is Cat.M2, and the terminal capability level with a third highest priority is Cat.1bis.

More details of working principles and working modes of the communication apparatus 5 can be found in the above descriptions of FIGS. 1 to 4, and are not described here.

In an embodiment of the present disclosure, a storage medium having computer instructions stored therein is provided, wherein when the computer instructions are executed, any one of the above methods as shown in FIGS. 1 to 4 is performed. In some embodiments, the storage medium may be a computer readable storage medium, such as a non-volatile memory or a non-transitory memory. The computer readable storage medium may include a Read Only Memory (ROM), a Random Access Memory (RAM), a magnetic disk or an optical disk.

In an embodiment of the present disclosure, a terminal including a memory and a processor is provided, wherein the memory has computer instructions stored therein, and when the processor executes the computer instructions, the method as shown in FIGS. 1 to 4 is performed. The terminal may be a wearable device.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A communication method for a wearable device, comprising:
    determining a network camping preference mode of the wearable device, wherein the network camping preference mode is determined based on a network camping priority, and the network camping priority indicates priorities of a plurality of terminal capability levels of the wearable device during a network camping procedure of the wearable device;
    determining a network version of a network to be camped on;
    determining a first terminal capability level based on the network version and the network camping priority, wherein the first terminal capability level has a highest priority among the plurality of terminal capability levels and is adapted to the network version; and
    communicating with the network to be camped on based on the first terminal capability, level.

2. The method according to claim 1, wherein based on the network version not supporting coverage enhancement, the first terminal capability level is compatible with the network version that does not support coverage enhancement.

3. The method according to claim 2, wherein the first terminal capability level having the highest priority among the plurality of terminal capability levels and compatible with the network version that does not support coverage enhancement is Cat.1bis.

4. The method according to claim 2, wherein said determining the network version of the network to be camped on comprises:
    receiving a Master Information Block (MIB) of the network to be camped on; and
    determining whether the network version of the network to be camped on supports coverage enhancement based on the MIB.

5. The method according to claim 2, wherein said determining the first terminal capability level based on the network version and the network camping priority comprises:
    based on the network version supporting coverage enhancement, determining whether the plurality of terminal capability levels are adapted to the network version in accordance with priority from high to low to obtain a determination result; and
    determining the first terminal capability level based on the determination result.

6. The method according to claim 5, wherein the plurality of terminal capability levels correspond to network versions in a one-to-one correspondence.

7. The method according to claim 1, wherein said determining the network version of the network to be camped on comprises:
    receiving system information of the network to be camped on; and
    determining the network version of the network to be camped on based on the system information.

8. The method according to claim 7, wherein the system information comprises MIB, System Information Block (SIB)1, SIB2, SIB3, SIB5, SIB14 or SIB20.

9. The method according to claim 1, wherein the network camping preference mode comprises a rate preference mode, a power consumption preference mode or a rate and coverage compromise mode,
    wherein the rate preference mode is configured to determine the network camping priority based on uplink and downlink data throughput performance, the power consumption preference mode is configured to determine the network camping priority based on power consumption performance, and the rate and coverage compromise mode is configured to determine the network camping priority based on the uplink and downlink data throughput performance and coverage enhancement performance.

10. The method according to claim 9, wherein in the rate preference mode, the terminal capability level with a highest priority is Non-BL Cat.1bis, and the terminal capability level with a second highest priority is Cat.1bis;
    in the power consumption preference mode, the terminal capability level with a highest priority is Cat-M1, and the terminal capability level with a second highest priority is Cat.1bis; and
    in the rate and coverage compromise mode, the terminal capability level with a highest priority is Non-BL Cat.1bis, the terminal capability level with a second highest priority is Cat.M2, and the terminal capability level with a third highest priority is Cat.1bis.

11. A non-transitory storage medium storing one or more programs, the one or more programs comprising computer instructions, which, when executed by a processor, cause the processor to:
    determine a network camping preference mode of the wearable device, wherein the network camping preference mode is determined based on a network camping priority, and the network camping priority indicates priorities of a plurality of terminal capability levels of the wearable device during a network camping procedure of the wearable device;
    determine a network version of a network to be camped on;
    determine a first terminal capability level based on the network version and the network camping priority, wherein the first terminal capability level has a highest priority among the plurality of terminal capability levels and is adapted to the network version; and
    communicate with the network to be camped on based on the first terminal capability level.

12. A terminal comprising a memory and a processor, wherein the memory has computer instructions stored therein, and when the processor executes the computer instructions, a communication method for a wearable device, wherein the method comprises:
    determining a network camping preference mode of the wearable device, wherein the network camping preference mode is determined based on a network camping priority, and the network camping priority indicates priorities of a plurality of terminal capability levels of the wearable device during a network camping procedure of the wearable device;

determining a network version of a network to be camped on;

determining a first terminal capability level based on the network version and the network camping priority, wherein the first terminal capability level has a highest priority among the plurality of terminal capability levels and is adapted to the network version; and communicating with the network to be camped on based on the first terminal capability level.

13. The non-transitory storage medium according to claim 11, wherein based on the network version not supporting coverage enhancement, the first terminal capability level is compatible with the network version that does not support coverage enhancement.

14. The non-transitory storage medium according to claim 13, wherein the first terminal capability level having the highest priority among the plurality of terminal capability levels and compatible with the network version that does not support coverage enhancement is Cat.1bis.

15. The non-transitory storage medium according to claim 13, wherein said determining the network version of the network to be camped on comprises:

receiving a Master Information Block (MIB) of the network to be camped on; and determining whether the network version of the network to be camped on supports coverage enhancement based on the MIB.

16. The non-transitory storage medium according to claim 13, wherein said determining the first terminal capability level based on the network version and the network camping priority, comprises:

based on the network version supporting coverage enhancement, determining whether the plurality of terminal capability levels are adapted to the network version in accordance with priority from high to low to obtain a determination result; and determining the first terminal capability level based on the determination result.

17. The terminal according to claim 12, wherein based on the network version not supporting coverage enhancement, the first terminal capability level is compatible with the network version that does not support coverage enhancement.

18. The terminal according to claim 17, wherein the first terminal capability level having the highest priority among the plurality of terminal capability levels and compatible with the network version that does not support coverage enhancement is Cat.1bis.

19. The terminal according to claim 17, wherein said determining the network version of the network to be camped on comprises:

receiving a Master Information Block (MIB) of the network to be camped on; and determining whether the network version of the network to be camped on supports coverage enhancement based on the MIB.

20. The terminal according to claim 17, wherein said determining the first terminal capability level based on the network version and the network camping priority comprises:

based on the network version supporting coverage enhancement, determining whether the plurality of terminal capability levels are adapted to the network version in accordance with priority from high to low to obtain a determination result; and determining the first terminal capability level based on the determination result.

* * * * *